United States Patent [19]
Kaucnik

[11] Patent Number: 5,451,081
[45] Date of Patent: Sep. 19, 1995

[54] FREEZE PROOF ADAPTER

[76] Inventor: Joseph J. Kaucnik, 2250 Parlane Ph# 16, Willoughby Hills, Ohio 44094

[21] Appl. No.: 956,360

[22] Filed: Oct. 5, 1992

[51] Int. Cl.⁶ ............................................. F16L 41/08
[52] U.S. Cl. ....................................... 285/56; 285/189; 285/331; 52/220.8
[58] Field of Search ................... 285/64, 331, 189, 56, 285/915; 52/573, 220.8, 169.5, 19, 20; 404/2, 3, 4, 25

[56] References Cited

.U.S. PATENT DOCUMENTS

| | | | |
|---|---|---|---|
| 2,837,750 | 6/1958 | Robinson | 285/56 X |
| 4,313,286 | 2/1982 | Harbeke | 52/220.8 |
| 4,325,405 | 4/1982 | Christo | 52/20 X |
| 4,475,844 | 10/1984 | Arntyr et al. | 52/19 X |
| 4,508,374 | 4/1985 | Kantor | 285/331 |
| 4,646,486 | 3/1987 | Hauff | 52/220.8 |
| 4,648,139 | 3/1987 | Stokes | 285/56 X |
| 4,659,251 | 4/1987 | Petter et al. | 52/20 X |
| 4,706,718 | 11/1987 | Milo | 52/20 X |
| 4,730,854 | 3/1988 | Cuschera | 285/915 X |
| 4,896,705 | 1/1990 | Podgers et al. | 52/20 X |
| 4,976,457 | 12/1990 | Carter | 52/220.8 X |
| 5,060,986 | 10/1991 | Carter | 52/220.8 X |
| 5,141,260 | 8/1992 | Burwell | 285/189 X |

FOREIGN PATENT DOCUMENTS

| | | | |
|---|---|---|---|
| 2901268 | 4/1980 | Germany | 285/189 |
| 2198963 | 6/1988 | United Kingdom | 285/331 |

Primary Examiner—Dave W. Arola
Assistant Examiner—Heather Chun Shackelford
Attorney, Agent, or Firm—Arthur L. Wolfe

[57] ABSTRACT

A freeze proof device for pipe is disclosed adapted to be permanently embedded in concrete or other material. The device has structure for automatically adjusting to the raising or lowering of the concrete caused by freezing and thawing of moist soil on which the concrete rests. The device is particularly useful for sewer tile.

3 Claims, 2 Drawing Sheets

FREEZE PROOF ADAPTER

BACKGROUND OF THE INVENTION

1. Field of the Invention

The present invention relates to an adapter or coupling for pipe or tile which is adapted to being embedded in concrete or other material and to raise or lower in response to freezing or thawing without damage to adapter, pipe or tile, or concrete. In particular, the present invention relates to an adapter or coupling for sewer pipe.

2. Description of Prior Art

Many types of adapters and couplings are described in the patent literature. U.S. Pat. No. 3,924,413 discloses fittings for attachment of boot plates or otherwise closing the end of pipe piling and for coupling vertically superimposed sections of pipe piling. U.S. Pat. No. 4,261,598 discloses a coupling for plastic pipe which is adapted to be embedded in a concrete floor and to form part of a fluid flow path with the pipe. U.S. Pat. No. 4,306,738 discloses a flanged fitting comprising a flanged tubular member for positioning in an opening in a floor or roof to form a tubular conduit therethrough. U.S. Pat. Nos. 4,313,286 and 4,453,354 disclose a device adapted to be permanently embedded in the masonry floor of a building structure for both supporting and joining pipe sections extending above and below the floor. U.S. Pat. No. 4,406,480 describes an improved plumbing fitting for coupling a water closet to a building surface and to a drain waste pipe. U.S. Pat. No. 4,730,854 discloses a floor drain including a cylindrical drain body having external threads formed thereabout and an upper flange extending radially outwardly from the drain body and disposed flush with the floor surface. U.S. Pat. No. 4,823,527 discloses a plumbing concrete form accessory including a large hollow displacement member having a hole in a wall thereof and defining a sleeve about the hole for snugly fitting the outside surface of a pipe. U.S. Pat. No. 5,035,097 discloses a coupling adapted to be pressed into a hole in a concrete floor or wall. However, none of the known literature discloses a coupling or adapter as described in the present invention made to accommodate the raising or lowering caused by freezing or thawing when exposed to the elements.

SUMMARY OF THE INVENTION

Applicant has invented a novel device which overcomes the disadvantage of damage to pipe or tile, or damage to the support of said pipe or tile, upon freezing or thawing when exposed to temperatures below or near the freezing point. This damage often is severe after repeated freezing and thawing cycles.

An object of the present invention is to provide an adapter for pipe or tile which overcomes the disadvantage of damage upon freezing and thawing, particularly when said freezing and thawing occurs repeatedly. It is also an object of the present invention to provide a leakproof connection between said device and said pipe or tile, so that all liquid will flow through said device and pipe or tile and not leak to an unwanted area. Another object of the present invention is to provide an adapter that is embedded in concrete or other masonry so that any and all liquid flows through said adapter and the pipe or tile to which it is attached. Yet another object of the present invention is to provide an adapter that can be embedded in concrete or other masonry so that the top of said adapter is flush with the top of said concrete or other masonry. Still another object of the present invention is to provide a method of joining one pipe situated below or near the frost line with another pipe situated at or above the frost line. Yet another object of the present invention is to provide a piping system which comprises a pipe with its surrounding soil, cement or other masonry support and a freeze proof device adapted to be embedded in concrete or other masonry and fitted to said pipe. Finally it is an object of the present invention to provide a freeze proof adapter for sewer pipe or tile. These and other objects of the present invention will become apparent from the following description and from the drawings.

DESCRIPTION OF THE PREFERRED EMBODIMENTS

Figure 1:
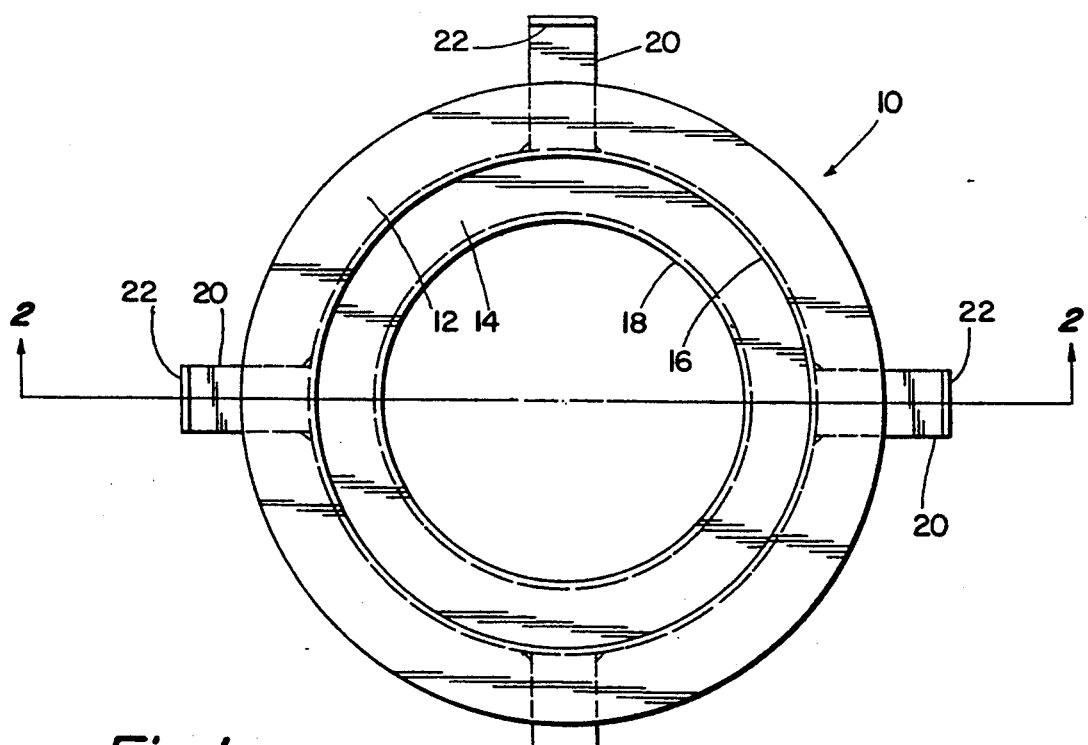
FIG. 1 is a top view of the device comprising the present invention.
Figure 2:
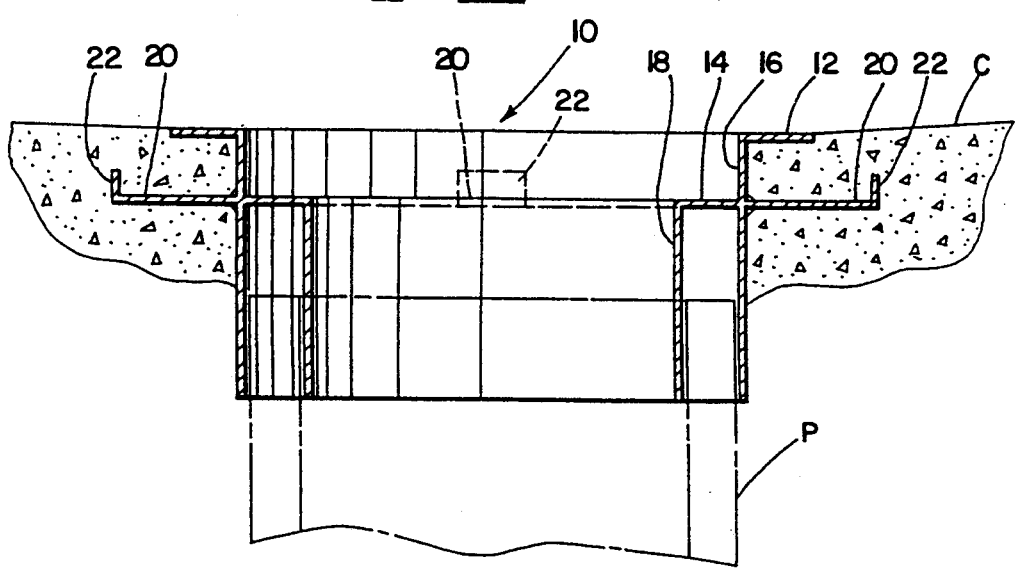
FIG. 2 is a side view in cross-section of the device in FIG. 1 taken along the lines 2—2 thereof.
Figure 3:
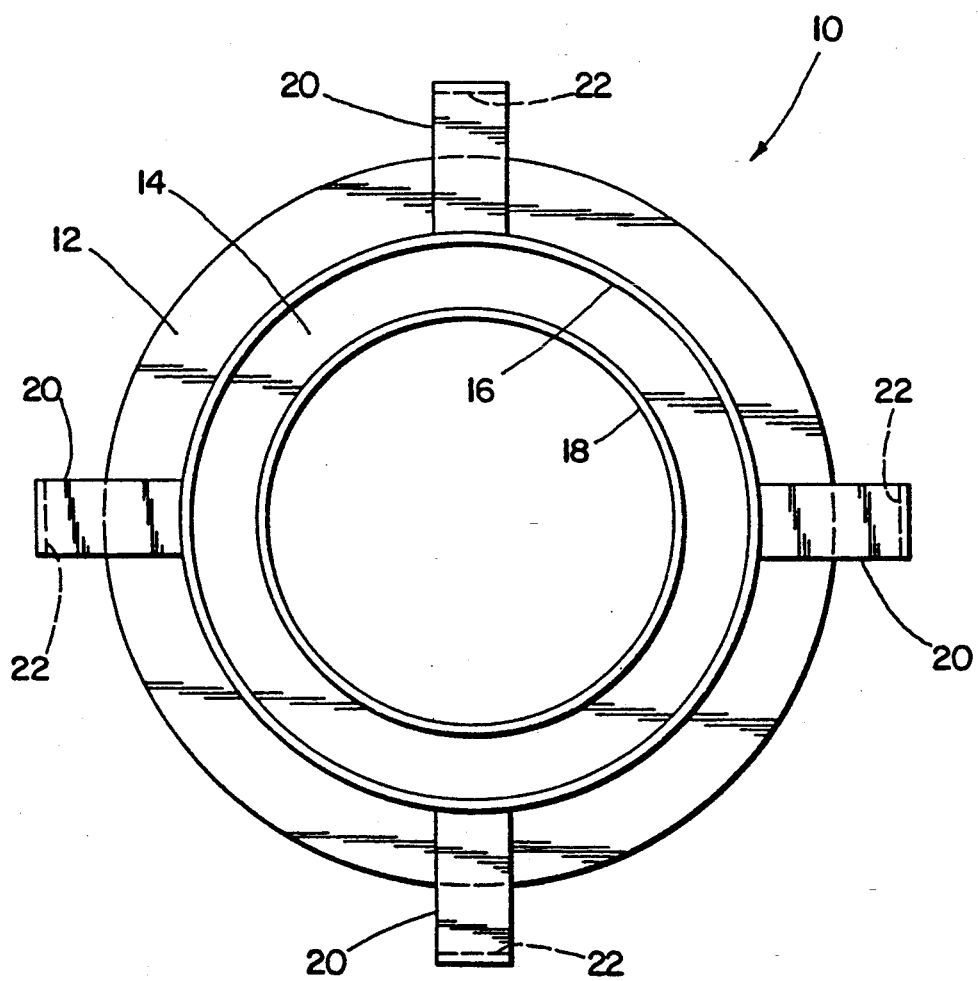
FIG. 3 is a bottom view of the device.

Referring to the drawings where like characters of reference indicate like elements in each of the views, FIGS. 1 and 2 illustrate freeze proof adapter 10 in views from the top and side cross-section, respectively. FIG. 3 illustrates the bottom of the adapter, in particular, the bottom of outer tube 16 and inner tube 18. FIGS. 1 and 2 illustrate how ring 12 connects permanently with the top of outer tube 16 which in turn connects permanently with inner horizontal support 14 and outer horizontal support 20. Vertical support 22 attaches permanently to outer horizontal support 20 as illustrated in FIG. 2. The purpose of outer horizontal support 20 and vertical support 22 is to provide additional gripping or holding power to embed freeze proof adapter 10 permanently in adjoining concrete C. Concrete C can be concrete, plastic, or like material. In light duty or short term applications not requiring a high degree of gripping or holding power to adjoining concrete C, outer horizontal support 20 and vertical support 22 can be eliminated without departing from the spirit of this invention. Although FIG. 1 illustrates freeze proof adapter 10 having four outer horizontal supports 20 spaced equidistant around the circumference of freeze proof adapter 10, it is possible to construct freeze proof adapters with two, three or more outer horizontal supports along with associated vertical supports 22 and be considered within the scope of this invention.

Again referring to FIGS. 1 and 2, the top of inner tube 18 attaches permanently to inner horizontal support 14 at its innermost point. The length of inner horizontal support 14 is chosen so that inner tube 18 and outer tube 16 are separated sufficiently from each other to permit placement over the end of pipe P, as shown in FIG. 2. Pipe P can be made from any material, such as metal, plastic, tile, and the like. Freeze proof adapter 10 is installed at a height such that inner support 14 clears the upper end of pipe P, that is, inner horizontal support 14 never comes into contact with the upper end of pipe P.

Figure 4:
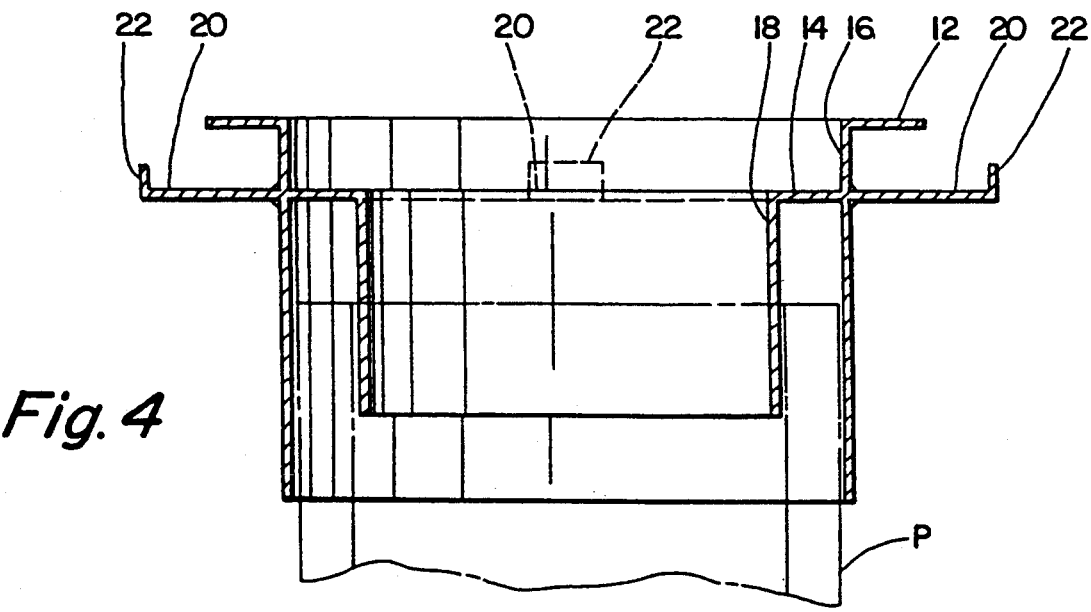
FIG. 4 is a side view in cross-section of the device in FIG. 1 taken along the lines 2—2 thereof showing outer tube 16 extending farther down than does inner tube 18.

FIG. 2 shows outer tube 16 and inner tube 18 extending an equal distance down from inner support 14. However, it is possible that outer tube 16 extends down from inner support 14 more than does inner tube 18 and still be within the scope of this invention, as illustrated in FIG. 4. The said distance is chosen so that outer tube 16 and inner tube 18 will always extend down sufficiently over the top of pipe P so that all liquid will flow down through said pipe P and not leak over the top of said pipe P into the outer area surrounding said pipe P. Freeze proof adapter 10 is constructed so that it can move up or down with concrete C when said concrete C moves up or down depending upon the temperature. Freeze proof adapter 10 adjusts itself automatically as concrete C itself may expand or contract with change of temperature or as concrete C moves up or down in response to freezing or thawing of the moist soil supporting said concrete C.

I claim:

1. A freeze proof device for a pipe having spaced apart parallel cylindrical inside and outside tubes which device is adapted to embed in concrete or otherwise attach to the said concrete which comprises:
   (a) an inner tube having an inside cylindrical wall defining a cylindrical longitudinal axis and an outside wall, said inner tube having a top and bottom axial ends, wherein the said outside wall of the tube mates with the inside wall of the said pipe;
   (b) an outer tube, parallel to and concentric with the said inner tube, having an inside cylindrical wall and an outside wall said inner tube having a top and bottom axial ends, wherein the said inside wall mates with the outside wall of the said pipe;
   (c) an inner horizontal support attached permanently to the top end of the said inner tube and to the inner side of the said outer tube; the said inner horizontal support of sufficient width and strength to hold the said inner tube and the said outer tube parallel to each other and capable of mating with the top end of the said pipe;
   (d) an outer horizontal support attached permanently to the outside wall of the said outer tube extending radially outward and embedded in concrete;
   (e) a vertical support attached permanently to the said outer horizontal support and embedded in concrete;
   (f) a ring attached permanently to the top end of the said outer tube and embedded in concrete so that a top surface of the said ring is flush with the top of the concrete.

2. The freeze proof device of claim 1 wherein the bottom end of the said outer tube extends farther down into the said pipe than does the bottom end of the said inner tube.

3. The freeze proof device of claim 2 wherein the said pipe is sewer tile.

* * * * *